(12) United States Patent
Murakami

(10) Patent No.: US 8,463,754 B2
(45) Date of Patent: Jun. 11, 2013

(54) ELECTRONIC EQUIPMENT AND LOG OUTPUT METHOD

(75) Inventor: Hirofumi Murakami, Kanagawa (JP)

(73) Assignee: Sony Corporation (JP)

( * ) Notice: Subject to any disclaimer, the term of this patent is extended or adjusted under 35 U.S.C. 154(b) by 826 days.

(21) Appl. No.: 12/286,386

(22) Filed: Sep. 30, 2008

(65) Prior Publication Data

US 2009/0094295 A1    Apr. 9, 2009

(30) Foreign Application Priority Data

Oct. 4, 2007   (JP) ................ P2007-260715

(51) Int. Cl.
*G06F 7/00*     (2006.01)
*G06F 17/00*    (2006.01)

(52) U.S. Cl.
USPC ........... 707/682; 707/702; 707/609; 707/687; 714/100; 714/1; 714/38.13

(58) Field of Classification Search
None
See application file for complete search history.

(56) References Cited

U.S. PATENT DOCUMENTS

| | | | |
|---|---|---|---|
| 5,544,359 A * | 8/1996 | Tada et al. ................ | 707/682 |
| 6,260,190 B1 * | 7/2001 | Ju ................................ | 717/156 |
| 2003/0018681 A1 * | 1/2003 | Subramanian et al. ....... | 709/102 |
| 2005/0036793 A1 * | 2/2005 | Endo ............................ | 399/10 |
| 2006/0225073 A1 * | 10/2006 | Akagawa et al. ............. | 718/1 |

FOREIGN PATENT DOCUMENTS

| | | |
|---|---|---|
| JP | 05-002855 A | 1/1993 |
| JP | 08016420 A | 1/1996 |
| JP | 2002073427 A | 3/2002 |
| JP | 2003271422 A | 9/2003 |
| JP | 2005-204183 A | 7/2005 |
| JP | 2006018660 A | 1/2006 |
| JP | 2006338445 A | 12/2006 |
| JP | 2007207014 A | 8/2007 |

OTHER PUBLICATIONS

Office Action from Japanese Application No. 2007-260715, dated Jun. 28, 2011.

* cited by examiner

*Primary Examiner* — Fred I Ehichioya
*Assistant Examiner* — Jau-Shya Meng
(74) *Attorney, Agent, or Firm* — Lerner, David, Littenberg, Krumholz & Mentlik, LLP

(57) ABSTRACT

There is provided electrical equipment which includes a macro file storage portion to store a macro file for acquiring log information under control of an operation system and log information outside control of the operation system at a time and a macro file executing portion to execute the macro file stored in the macro file storage portion and record log information obtained as a result of executing the macro file into a removable external recording medium.

8 Claims, 7 Drawing Sheets

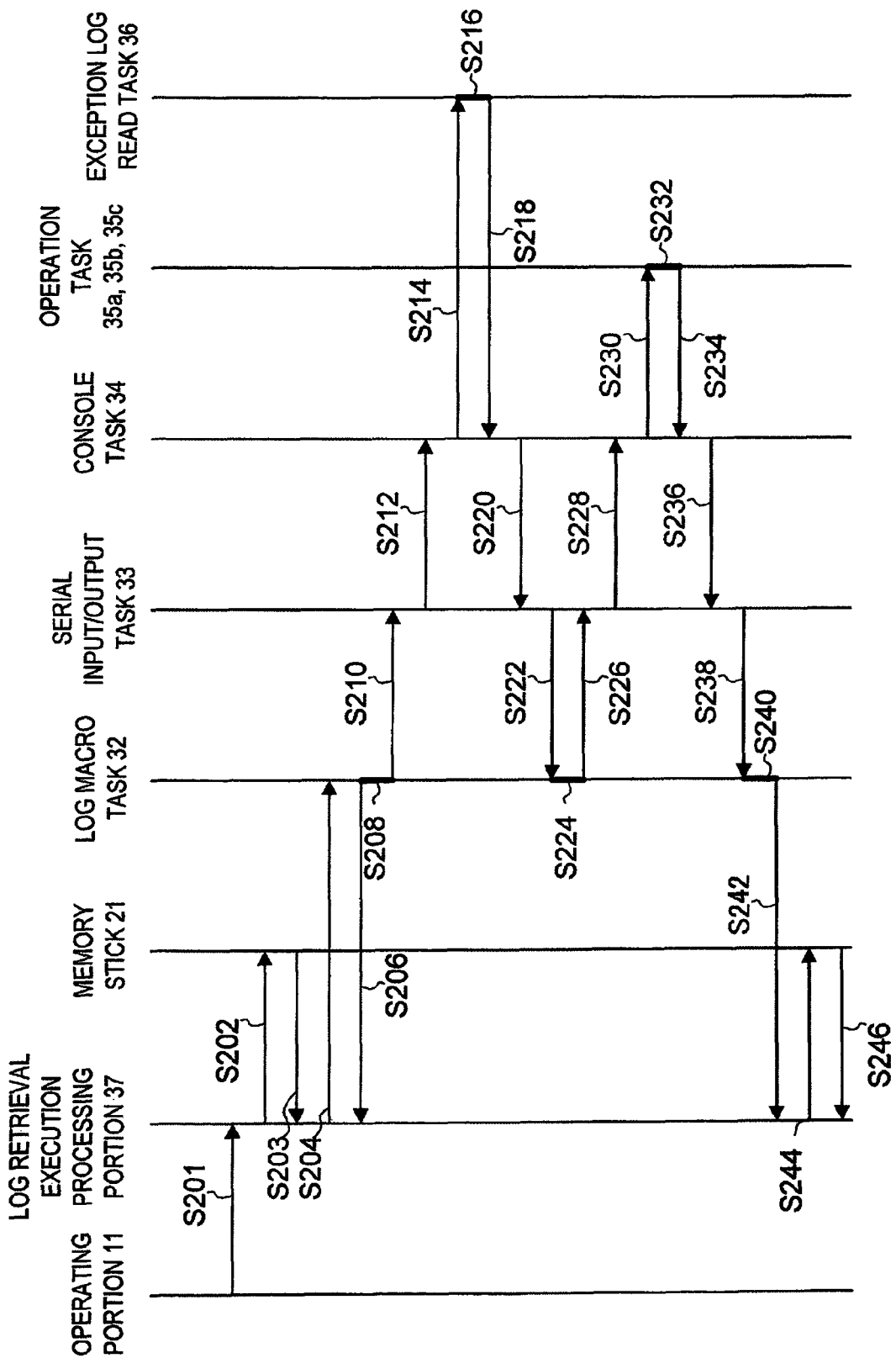

ELECTRONIC EQUIPMENT AND LOG OUTPUT METHOD

CROSS-REFERENCE TO RELATED APPLICATION

The present application claims priority from Japanese Patent Application JP No. 2007-260715 filed in the Japan Patent Office on Oct. 4, 2007, the entire content of which is incorporated herein by reference.

BACKGROUND OF THE INVENTION

1. Field of the Invention

The present invention relates to electronic equipment and a log output method.

2. Description of the Related Art

In various kinds of recent electronic equipment such as video equipment, audio equipment, recording and reproducing apparatus, communication apparatus and information processing apparatus, particularly in electronic equipment whose operation is controlled by a controller which is a built-in microcomputer/processor, it is effective to analyze log data of each operational task which functions on the microcomputer/processor in the event of malfunction or the like in order to determine the cause of the malfunction.

SUMMARY OF THE INVENTION

In the event of malfunction of electronic equipment, it is efficient for a maintenance service staff that conducts inspection and repairs to examine log data first in order to track down the cause and considers how to deal with it. As a result of examining log data, malfunction may be corrected in some cases by telling a user what to do by telephone or email, for example, without the need for the user to bring electronic equipment. In light of this, in the case where malfunction occurs in electronic equipment when it is used by a general user, it is most preferred that the user retrieves log data and presents it to a maintenance service staff.

However, it is very difficult for a user to remove the case of electronic equipment, connect a personal computer thereto, retrieve log data and transmit it to a maintenance service staff. Further, it may cause another malfunction that a user opens up the case of electronic equipment, and therefore it is almost impossible in practice. Accordingly, even when malfunction is actually minor enough to be corrected easily on the user side if a user knows how to deal with it, a user needs to bring electronic equipment to a store with a maintenance service staff. This bothers a user and causes a time loss until repair is completed.

Further, even if a user has knowledge of retrieving log data, the above work is very troublesome, and it is necessary to install software for retrieving log data in the above work into a user's own personal computer. Furthermore, if a knowledgeable user or a maintenance service staff inputs an incorrect command while performing the above work by connecting a personal computer to electronic equipment, it may cause a further failure in the electronic equipment.

In order to address the above issue, there is a method of retrieving log data by executing a command from a Web browser through a network. However, the method is not applicable to electronic equipment which has no network interface.

Further, if malfunction is such that an electronic equipment main body is hung up, the electronic equipment cannot be controlled and a command is not executable at all. In such a case, it is extremely difficult to retrieve information for getting such a symptom afterward.

In light of the foregoing, it is desirable to provide novel and improved electronic equipment and log output method which are capable of easily retrieving log data under or outside control of an operation system by storing a macro file inside a main body or into a removable external recording medium and executing the stored macro file.

According to an embodiment of the present invention, there is provided electrical equipment which includes an external recording medium inserting portion to which a removable external recording medium is inserted, a macro file storage portion to store a macro file for acquiring log information under control of an operation system and log information outside control of the operation system at a time, and a macro file executing portion to execute the macro file stored in the macro file storage portion and record log information obtained as a result of executing the macro file into the external recording medium inserted in the external recording medium inserting portion.

In this configuration, a removable external recording medium is inserted into the external recording medium inserting portion, and a macro file for acquiring log information under control of an operation system and log information outside control of the operation system at a time is stored into the macro file storage portion. Then, the macro file executing portion executes the macro file which is stored in the macro file storage portion, thereby recording log information that is obtained as a result of executing the macro file into the external recording medium which is inserted in the external recording medium inserting portion. It is thereby possible to easily acquire log data under and outside control of an operation system by storing a macro file inside a main body and executing the stored macro file.

The log information outside control of the operation system may be log information which is output as a result of performing exceptional interrupt handling in a central processing unit (CPU). It is thereby possible to acquire log data which is output as a result of performing exceptional interrupt handling in a CPU by storing a macro file inside a main body and executing the stored macro file, so as to locate the cause of malfunction of electrical equipment.

According to another embodiment of the present invention, there is provided electrical equipment which includes an external recording medium inserting portion to which a removable external recording medium to store a macro file for acquiring log information under control of an operation system and log information outside control of the operation system at a time is inserted, and a macro file executing portion to execute the macro file stored in the external recording medium and record log information obtained as a result of executing the macro file into the external recording medium.

In this configuration, a removable external recording medium to store a macro file for acquiring log information under control of an operation system and log information outside control of the operation system at a time is inserted into the external recording medium inserting portion. Then, the macro file executing portion executes the macro file which is stored in the external recording medium, thereby recording log information that is obtained as a result of executing the macro file into the external recording medium. It is thereby possible to easily acquire log data under and outside control of an operation system by storing a macro file into a removable external recording medium and executing the stored macro file.

The log information outside control of the operation system may be log information which is output as a result of performing exceptional interrupt handling in a CPU. It is thereby possible to acquire log data which is output as a result of performing exceptional interrupt handling in a CPU by storing a macro file into a removable external recording medium and executing the stored macro file, so as to locate the cause of malfunction of electrical equipment.

According to another embodiment of the present invention, there is provided a log output method which includes the steps of storing a macro file for acquiring log information under control of an operation system and log information outside control of the operation system at a time, and executing the macro file stored in the storing step and recording log information obtained as a result of executing the macro file into a removable external recording medium.

According to another embodiment of the present invention, there is provided a log output method which includes the steps of storing a macro file for acquiring log information under control of an operation system and log information outside control of the operation system at a time into a removable external recording medium, and executing the macro file stored in the external recording medium and recording log information obtained as a result of executing the macro file into the external recording medium.

According to the embodiments of the present invention described above, it is possible to provide novel and improved electronic equipment and log output method which are capable of easily retrieving log data under and outside control of an operation system by storing a macro file inside a main body or into a removable external recording medium and executing the stored macro file.

BRIEF DESCRIPTION OF THE DRAWINGS

FIG. 6 is a flowchart showing a log output method using the recording and reproducing apparatus 1 according to a second embodiment of the present invention.

DETAILED DESCRIPTION OF THE PREFERRED EMBODIMENTS

Figure 1:
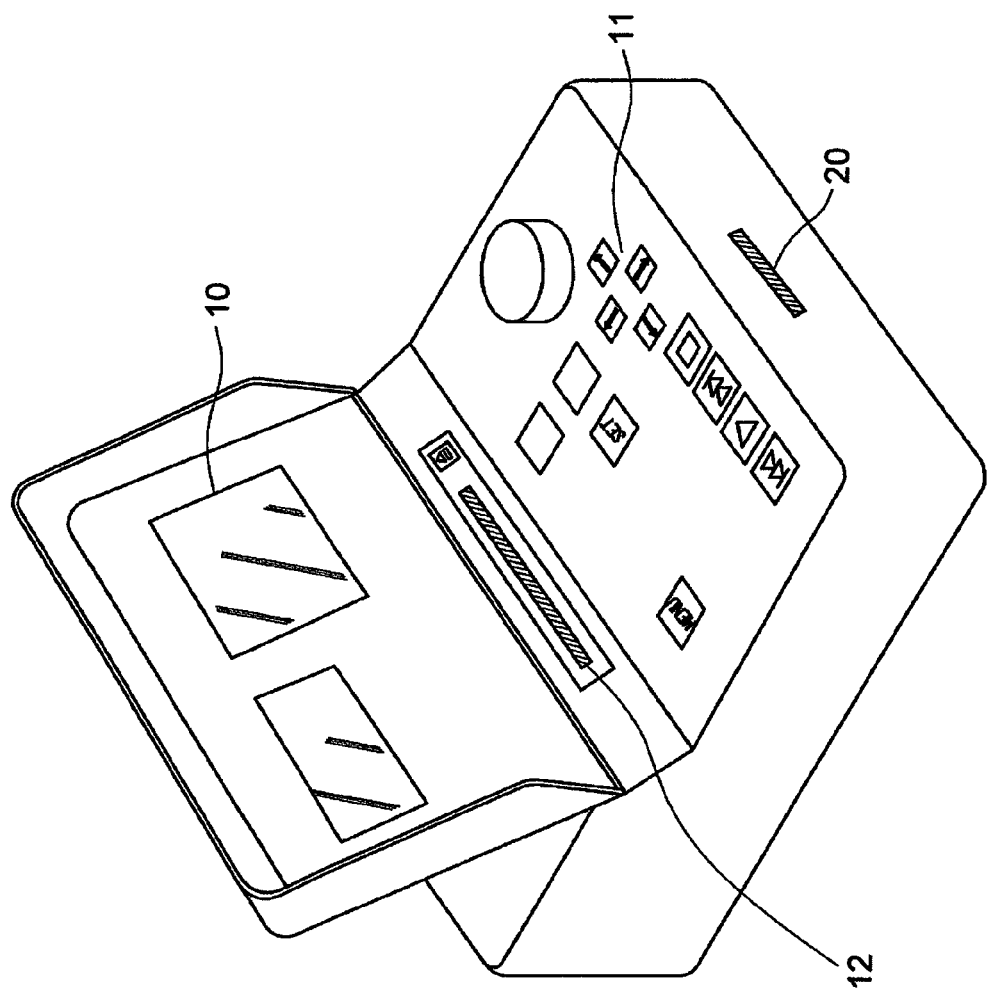
FIG. 1 is an explanatory view showing the appearance of a recording and reproducing apparatus 1 according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

Electronic equipment according to a first embodiment of the present invention is described hereinafter. In the first embodiment of the present invention, a recording and reproducing apparatus is described as an example of electronic equipment. FIG. 1 is an explanatory view showing the appearance of a recording and reproducing apparatus 1 according to the first embodiment of the present invention. The recording and reproducing apparatus 1 according to the first embodiment of the present invention is described hereinafter with reference to FIG. 1.

The recording and reproducing apparatus 1 is a portable video editing apparatus for business use, which is assumed to be used for editing a video that is shot by a television broadcaster, a program producer and so on in a shooting site or the like, for example. An optical disc, as an example of a recording medium, may be inserted into the recording and reproducing apparatus 1, so that the recording and reproducing apparatus 1 performs editing or the like of video data which is recorded on the optical disc.

Referring to FIG. 1, the recording and reproducing apparatus 1 includes a disc inserting portion 12 into which an optical disc is inserted. The recording and reproducing apparatus 1 also includes a display portion 10 which displays a video or the like that is reproduced from an optical disc. The recording and reproducing apparatus 1 further includes various kinds of operating pieces (e.g. an operating key, an operating dial etc.) as an operating portion 11 through which various information or operation is input to the recording and reproducing apparatus 1, and a slot 20 into which a removable external recording medium such as a memory stick (trademark) is inserted.

The recording and reproducing apparatus 1 according to the first embodiment of the present invention is described in the foregoing. In the following, the internal configuration of the recording and reproducing apparatus 1 according to the first embodiment of the present invention is described.

Figure 2:
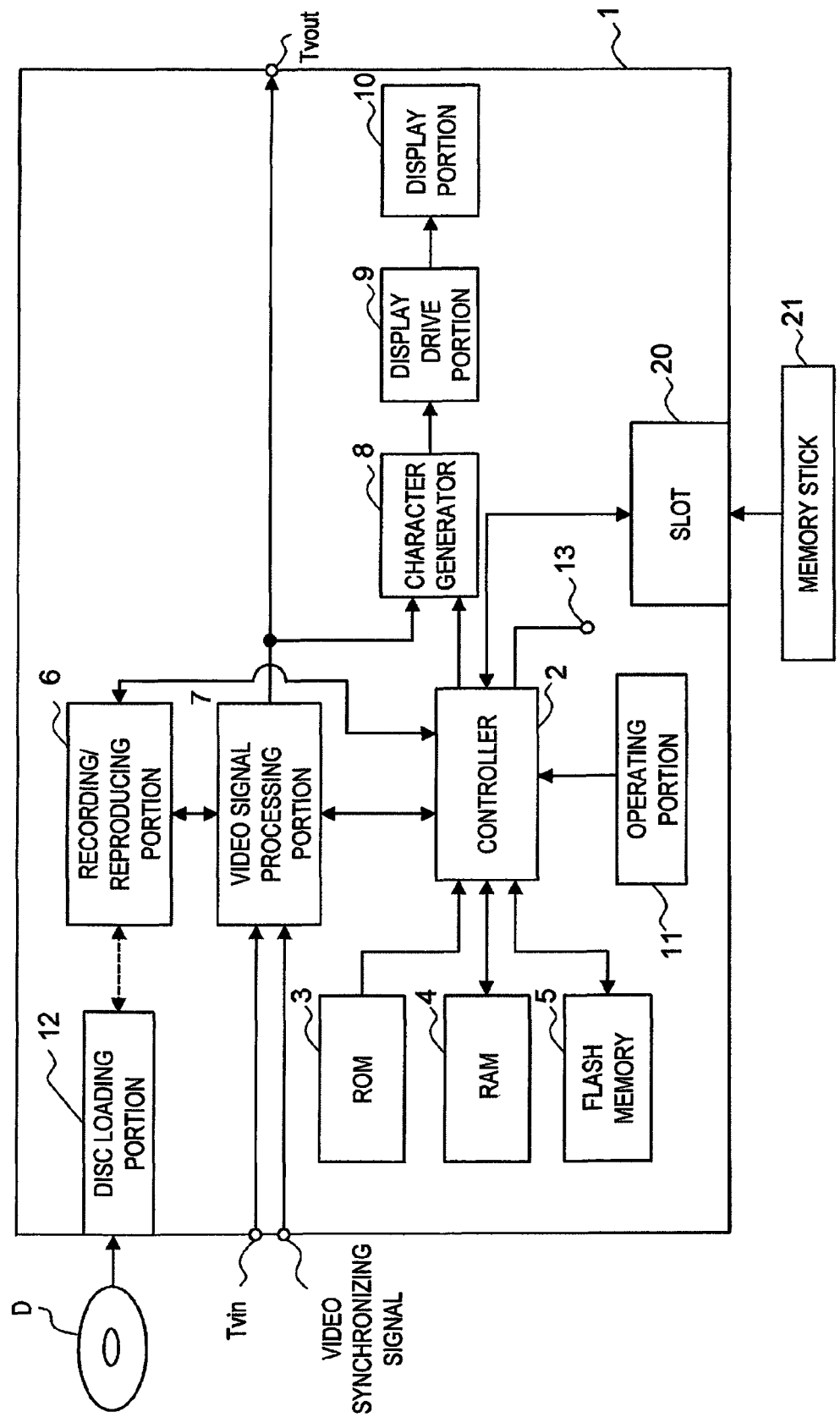
FIG. 2 is an explanatory view showing the internal configuration of the recording and reproducing apparatus 1 according to the first embodiment of the present invention.

FIG. 2 is an explanatory view showing the internal configuration of the recording and reproducing apparatus 1 according to the first embodiment of the present invention. The internal configuration of the recording and reproducing apparatus 1 according to the first embodiment of the present invention is described hereinafter with reference to FIG. 2.

Referring to FIG. 2, the recording and reproducing apparatus 1 according to the first embodiment of the present invention includes a controller 2, a read only memory (ROM) 3, a random access memory (RAM) 4, a flash memory 5, a recording/reproducing portion 6, a video signal processing portion 7, a character generator 8, a display drive portion 9, a display portion 10, an operating portion 11, a disc inserting portion 12, a serial input/output terminal 13, and a slot 20.

The controller 2 is configured by a microcomputer which includes a central processing unit (CPU), a memory area, an interface, and so on, and performs overall control and processing of the recording and reproducing apparatus 1 based on a program. For example, the controller 2 controls operation according to an operation input using the operating portion 11, recording/reproducing operation on an optical disc D which is inserted in the disc inserting portion 12, access operation and so on.

For example, if a user gives a reproduction direction for the optical disc D using the operating portion 11, the controller 2 directs the recording/reproducing portion 6 to reproduce data on the optical disc D. Then, the recording/reproducing portion 6 executes operations of accessing and reproducing the optical disc D and supplies reproduced data which is obtained thereby to the video signal processing portion 7. The video signal processing portion 7 performs video signal processing on the supplied reproduced data (video data) according to need and then supplies it to the character generator 8. In normal reproduction mode, the controller 2 previously directs the character generator 8 to output the video data as it is. The video data which is output from the character generator 8 is supplied to the display drive portion 9, and the display drive portion 9 drives and controls the display portion 10 based on the video data. A video is thereby displayed based on the video data which is reproduced from the optical disc D.

The ROM 3, the RAM 4 and the flash memory 5 are placed inside the recording and reproducing apparatus 1 as memory to which the controller 2 accesses. In the ROM 3, an operation program of the controller 2, a program loader and so on are stored. In the RAM 4, a data area and a task area for the controller 2 to execute a program are temporarily secured. The flash memory 5 is a nonvolatile memory in which data is rewritable and recorded data is retained even after power off. In the flash memory 5, various calculation coefficients, parameters to be used for a program and so on are stored, for example.

The recording/reproducing portion 6 performs recording/reproducing operation for the optical disc D which is inserted in the disc inserting portion 12. The recording/reproducing portion 6 includes elements for recording and reproducing data recorded on the optical disc D, such as an optical head, a spindle motor, a servo circuit, a decoder for acquiring reproduced data, an encoder for generating recording data and so on. Data which is reproduced from the inserted optical disc D is supplied from the recording/reproducing portion 6 to the video signal processing portion 7. Data to be recorded onto the optical disc D is input to the recording/reproducing portion 6 from the video signal processing portion 7.

The video signal processing portion 7 receives video data which is reproduced from the optical disc D by the recording/reproducing portion 6 and can also receive video data from a video input terminal Tvin. Further, the video signal processing portion 7 can accept an input of a video synchronizing signal for synchronizing a video. The video signal processing portion 7 performs various video signal processing (image signal processing) on input video data. For example, the video signal processing portion 7 performs video level adjustment processing, chroma level adjustment processing, setup level adjustment processing, chroma phase adjustment processing, system phase adjustment processing, sync phase adjustment processing and so on. The video signal processing portion 7 executes the above-described signal processing based on a set value that is directed for each processing from the controller 2, which is described later. An output of the video signal processing portion 7 is supplied to a video output terminal Tvout and also to the character generator 8.

The character generator 8 is configured to superimpose characters such as letters and icons which are generated therein onto input video data. For example, the character generator 8 generates character data as graphical user interface (GUI) for a user to adjust a set value for various signal processing which is performed in the signal processing portion 7. Output data from the character generator 8 is supplied to the display drive portion 9.

The character generator 8 can superimpose character data so that characters are displayed on top of a video (image) which is displayed based on an output from the signal processing portion 7. Alternatively, the character generator 8 can generate image data so that only characters are displayed. Further, the character generator 8 can output an output from the signal processing portion 7 as it is without superimposing characters thereon. The character generator 8 switches between those operations based on a direction from the controller 2.

The display drive portion 9 drives display on the display portion 10, which is a liquid crystal display or the like, based on input data from the character generator 8. Display is thereby made on the display portion 10 based on an output (video or image) from the character generator 8.

The serial input/output terminal 13 is a connection terminal conforming to the RS232C standard, for example, which is placed inside a case, and it is used for peculiar work such as equipment maintenance, repair and so on.

The configuration of the recording and reproducing apparatus 1 according to the first embodiment of the present invention is described in the foregoing. In the following, the functional configuration of the recording and reproducing apparatus 1 according to the first embodiment of the present invention is described.

Figure 3:
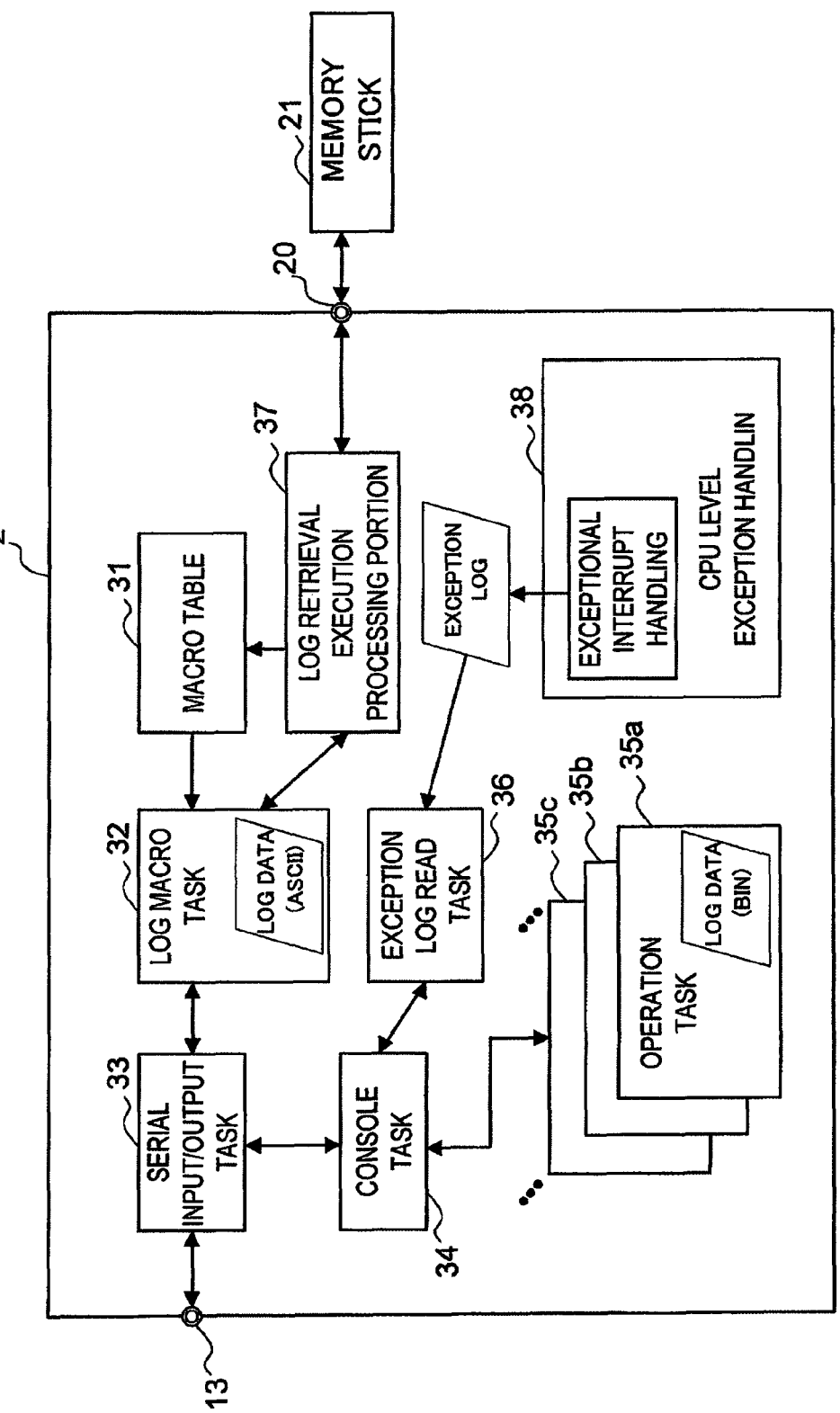
FIG. 3 is an explanatory view showing the functional configuration of the recording and reproducing apparatus 1 according to the first embodiment of the present invention.

FIG. 3 is an explanatory view to describe the functional configuration of the recording and reproducing apparatus 1 according to the first embodiment of the present invention. The functional configuration of the recording and reproducing apparatus 1 according to the first embodiment of the present invention is described hereinafter with reference to FIG. 3.

FIG. 3 shows the functional configuration related to log retrieval in the controller 2. In electronic equipment such as the recording and reproducing apparatus 1, for example, the controller 2 is configured to include the configuration as shown in FIG. 3 so as to retrieve a log of each operation task in the controller 2 (microcomputer) by a removable external recording medium which is inserted into the slot 20.

Referring to FIG. 3, the recording and reproducing apparatus 1 according to the first embodiment of the present invention is configured so that a macro table 31, a log macro task 32, a serial input/output task 33, a console task 34, operation tasks 35a, 35b and 35c, an exception log read task 36, and a log retrieval execution processing portion 37 function in the controller 2.

When the log macro task 32 receives a log retrieval execution command from the log retrieval execution processing portion 37, it receives a macro file from the macro table 31, analyzes and decomposes it into a character string which the console task 34 can interpret, and passes it to the serial input/output task 33. Further, the log macro task 32 receives an ASCII string which is output from the serial input/output task 33 and stores it as log data. The stored log data is passed to a memory stick 21 through the log retrieval execution processing portion 37 in response to a log retrieval request from the log retrieval execution processing portion 37.

The serial input/output task 33 passes serial input data from an external device which is connected to the serial input/output terminal 13 or data which is received from the log macro task 32 to the console task 34. Further, the serial input/output task 33 passes a character string for output (e.g. American Standard Code for information interchange (ASCII)) which is supplied from the console task 34 to the serial input/output terminal 13 or to the log macro task 32.

The console task 34 executes a function defined by each operation task 35a, 35b and 35c according to a debug command string defined by each operation task, retrieves an ASCII string as an output result, and passes it to the serial input/output task 33. Further, the console task 34 retrieves a log (exception log) of exception handling of the CPU 38 which is read out by the exception log read task 36 and passes it to the serial input/output task 33.

Because log data is generally stored as binary data in the operation tasks 35a, 35b and 35c, the console task 34 converts it into character data in ASCII codes, so that a maintenance service staff who retrieves a log, for example, can examine the contents of the log. Although FIG. 3 illustrates three operation tasks, the number of operation tasks is not limited thereto.

The operation tasks 35a, 35b and 35c are processing units for performing various kinds of operation control of electronic equipment as the recording and reproducing apparatus 1, for example. Each of the operation tasks 35a, 35b and 35c has log data as an activity log of each task, in the form of binary data. The log data is an example of a log under control of an operation system which operates on the recording and reproducing apparatus 1, and the contents of the log data can be examined as an ASCII string by a debug command which is provided by the console task 34.

The exception log read task 36 retrieves a log (exception log) of exception handling of the CPU 38, which is an example of a log outside control of an operation system which operates on the recording and reproducing apparatus 1. When exception handling is performed in the CPU 38, exceptional interrupt handling is executed. In the exceptional interrupt handling, a program address where exception handling is performed, a factor of exception handling, and an execution state of the CPU 38 before the occurrence of exception handling in the case where exception handling is performed in the CPU 38 are stored as an exception log into the flash memory 5. An exception log may be stored into the flash memory 5 after being compressed in order to save the capacity.

The log retrieval execution processing portion 37 transmits a log retrieval execution command to the log macro task 32 according to a log retrieval direction from a user through the operating portion 11.

In this embodiment, the configuration of FIG. 3 is included in the recording and reproducing apparatus 1, so that a log inside the recording and reproducing apparatus 1 can be recorded into the memory stick 21.

The functional configuration of the recording and reproducing apparatus 1 according to the first embodiment of the present invention is described in the foregoing. In the following, a log output method using the recording and reproducing apparatus 1 according to the first embodiment of the present invention is described.

Figure 4:
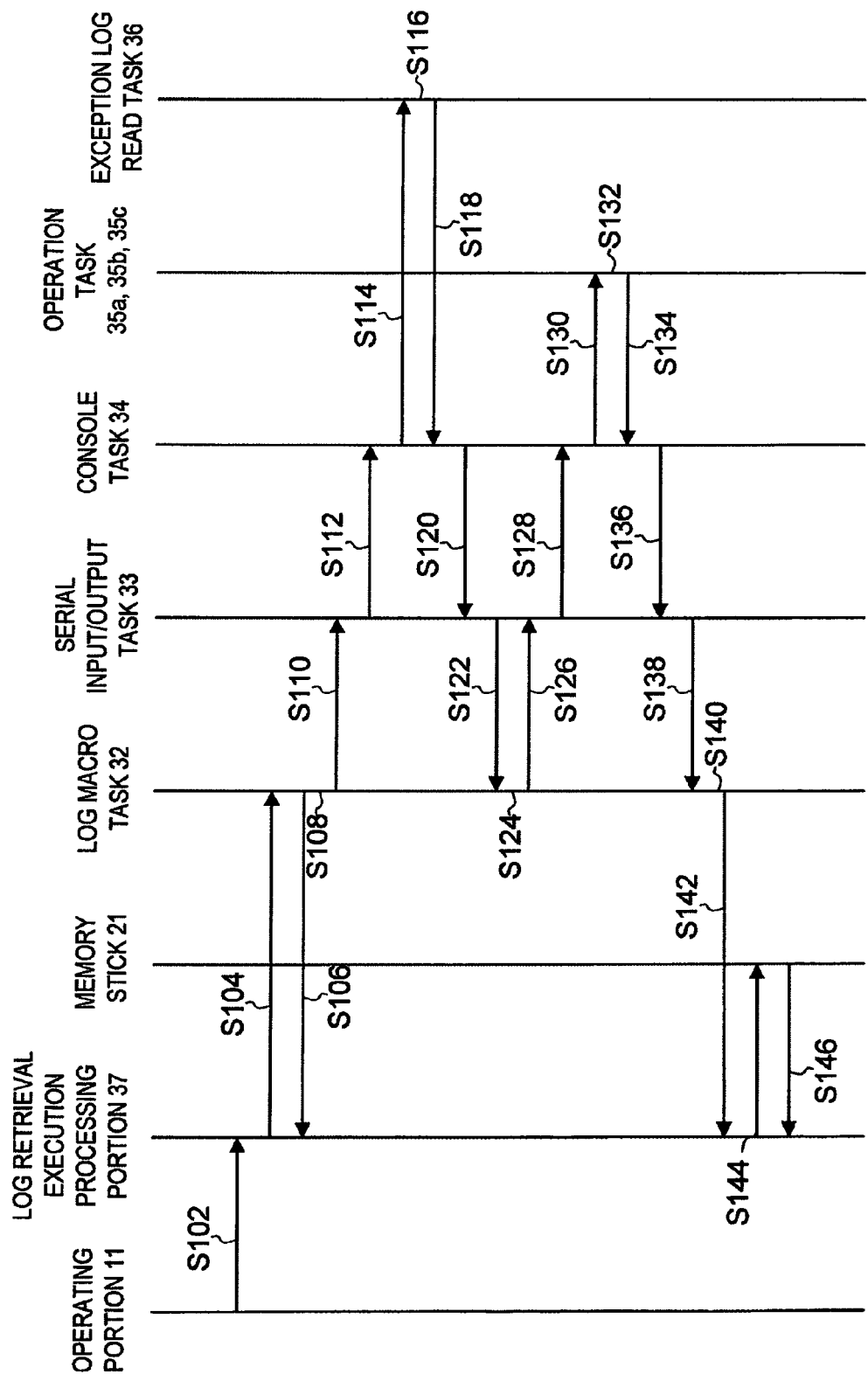
FIG. 4 is a flowchart showing a log output method using the recording and reproducing apparatus 1 according to the first embodiment of the present invention.

FIG. 4 is a flowchart showing a log output method using the recording and reproducing apparatus 1 according to the first embodiment of the present invention. The log output method using the recording and reproducing apparatus 1 according to the first embodiment of the present invention is described hereinafter with reference to FIG. 4.

First, a direction to execute log retrieval processing is made by a user through the operating portion 11 (step S102). In response to the log retrieval processing execution direction, the log retrieval execution processing portion 37 transmits a log retrieval execution command to the log macro task 32, and the macro table 31 sends a macro table for retrieving a log to the log macro task 32 (step S104).

Figure 5A:
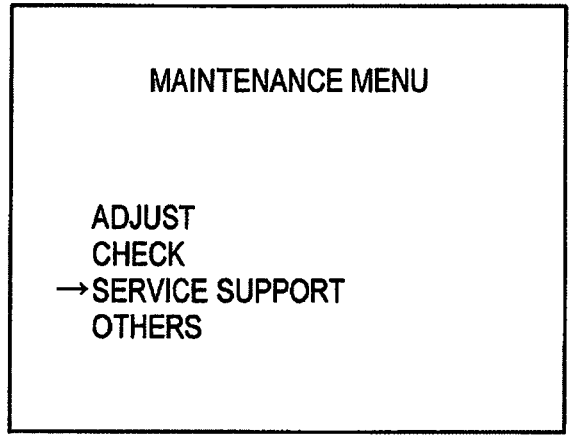
FIG. 5A is an explanatory view showing an example of a screen which is displayed on a display portion 10.
Figure 5B:
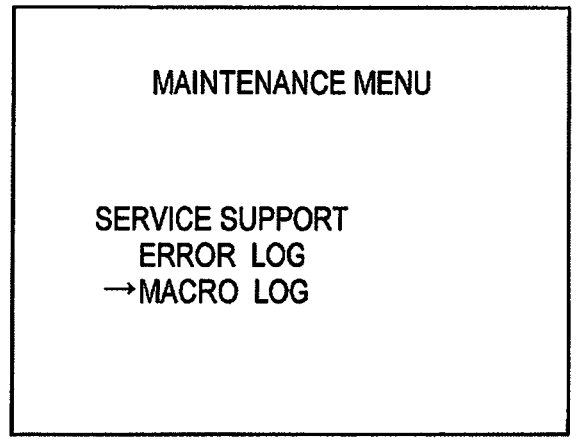
FIG. 5B is an explanatory view showing an example of a screen which is displayed on the display portion 10.
Figure 5C:
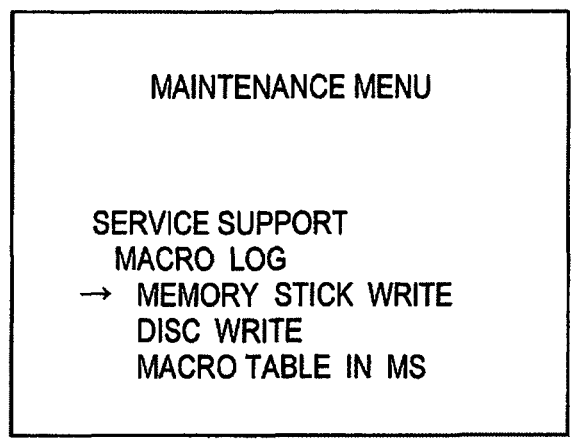
FIG. 5C is an explanatory view showing an example of a screen which is displayed on the display portion 10.

FIGS. 5A to 5C are explanatory views showing examples of screens which are displayed on the display portion 10 for a user to perform log retrieval processing using the recording and reproducing apparatus 1 according to the first embodiment of the present invention. FIG. 5A is an example of a maintenance menu of the recording and reproducing apparatus 1. A user first selects "SERVICE SUPPORT" to perform log retrieval processing. Upon selection of "SERVICE SUPPORT", the screen changes to the one as shown in FIG. 5B. On the screen as shown in FIG. 5B, the user selects "MACRO LOG" to perform log retrieval processing using a macro table.

Upon selection of "MACRO LOG", the screen changes to the one as shown in FIG. 5C. On the screen as shown in FIG. 5C, the user selects "MEMORY STICK WRITE" to perform log retrieval processing using a macro table which is built in the recording and reproducing apparatus 1 and records a log file into the memory stick 21.

After receiving the log retrieval execution command and the macro table, the log macro task 32 notifies the log retrieval execution processing portion 37 that retrieval is completed (step S106), executes analysis of the macro table which is transmitted from the macro table 31 to the log macro task 32, and converts it into a character string which the console task 34 can interpret (step S108). Then, the log macro task 32 performs processing of sequentially capturing log data of each of the operation tasks 35a, 35b and 35c and an exception log which is read out by the exception log read task 36 as a log retrieval operation according to the macro file.

Specifically, in this processing, the log macro task 32 passes a log retrieval request for the exception log read task 36 to the serial input/output task 33 (step S110). Receiving the log retrieval request from the log macro task 32, the serial input/output task 33 passes the log retrieval request to the console task 34 (step S112). Then, the console task 34 passes the log retrieval request to the exception log read task 36 (step S114).

Receiving the log retrieval request, the exception log read task 36 reads out an exception log which is recorded in the flash memory 5, converts it into ASCII data and obtains exception log data (step S116). Then, the exception log read task 36 passes the exception log data which is read out from the flash memory 5 to the console task 34 (step S118).

Receiving the exception log data, the console task 34 passes the exception log data to the serial input/output task 33 (step S120). Then, the serial input/output task 33 passes the received exception log data to the log macro task 32 (step S122), and the log macro task 32 stores the received exception log data into a log file, which is recorded into the memory stick 21 afterward (step S124).

After completing the storage of the exception log data, processing of retrieving log data of each operation task starts subsequently. The log macro task 32 passes a log retrieval request for the operation tasks 35a, 35b and 35c to the serial input/output task 33 (step S126). Receiving the log retrieval request from the log macro task 32, the serial input/output task 33 passes the log retrieval request to the console task 34 (step S128). Then, the console task 34 passes the log retrieval request to the operation tasks 35a, 35b and 35c (step S130).

Receiving the log retrieval request, the operation tasks 35a, 35b and 35c convert log data into ASCII data (step S132), and the console task 34 receives the converted log data (step S134). In this embodiment, the console task 34 executes a function defined by each operation task 35a, 35b, 35c according to a debug command string defined by each operation task. Then, the console task 34 retrieves log data which is stored in the form of binary codes in the operation tasks 35a, 35b and 35c as log data in the form of ASCII codes.

Receiving the log data of the operation tasks 35a, 35b and 35c, the console task 34 passes the log data to the serial input/output task 33 (step S136). Then, the serial input/output task 33 passes the received log data to the log macro task 32 (step S138), and the log macro task 32 stores the received log data into the log file, which is recorded into the memory stick 21 afterward (step S140).

After storing the exception log data and the log data into the log file, the log macro task 32 notifies the log retrieval execution processing portion 37 that macro file analysis is completed (step S142). In addition to the notification of completion of macro file analysis, the log macro task 32 passes the log file which is generated as a result of analyzing the macro file to the log retrieval execution processing portion 37. Receiving the notification of completion of macro file analysis, the log retrieval execution processing portion 37 writes the log file into the memory stick 21 (step S144). After completing writing of the log file, the memory stick 21 notifies the log retrieval execution processing portion 37 that writing is completed (step S146).

In the above operation, the log data of the operation tasks 35a, 35b and 35c of the recording and reproducing apparatus 1 and the exception log data recorded in the flash memory 5 are recorded into the memory stick 21 which is inserted in the slot 20. By examining the log data which is recorded in the memory stick 21, a service staff who handles the maintenance of the recording and reproducing apparatus 1 can locate the cause of malfunction without the need for the recording and reproducing apparatus 1 to be brought in.

Second Embodiment

In the first embodiment of the present invention, a log file is stored into the memory stick 21 which is inserted in the slot 20 by executing a macro table that is built in the recording and reproducing apparatus 1. In a second embodiment of the present invention, a recording and reproducing apparatus which stores a log file into a memory stick by previously storing a macro table into a memory stick to be inserted into the slot 20 and executing the macro table that is stored in the memory stick is described.

The appearance and the configuration of the recording and reproducing apparatus 1 according to the second embodiment of the present invention are the same as the recording and reproducing apparatus 1 according to the first embodiment of the present invention, and therefore detailed description of those is omitted. The operation of the recording and reproducing apparatus 1 according to the second embodiment of the present invention is described hereinbelow.

FIG. 6 is a flowchart showing a log output method using the recording and reproducing apparatus 1 according to the second embodiment of the present invention. The log output method using the recording and reproducing apparatus 1 according to the second embodiment of the present invention is described hereinafter with reference to FIG. 6.

First, a direction to execute log retrieval processing using a macro table which is recorded in the memory stick 21 that is inserted in the slot 20 is made by a user through the operating portion 11 (step S201). When the log retrieval processing execution direction is made, the log retrieval execution processing portion 37 receives the execution direction and makes a request for reading the macro table to the memory stick 21 (step S202). Then, the log retrieval execution processing portion 37 reads out the macro table which is stored in the memory stick 21 (step S203).

Figure 5D:
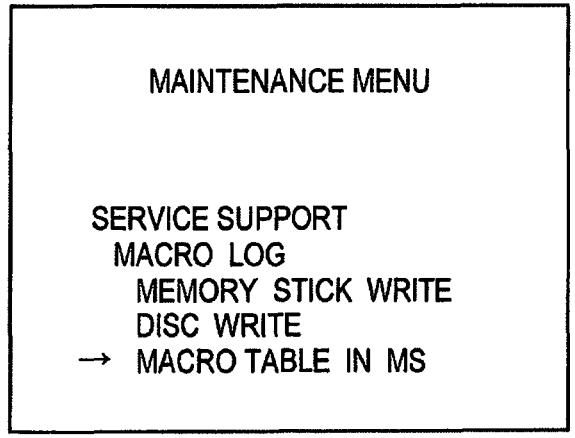
FIG. 5D is an explanatory view showing an example of a screen which is displayed on the display portion 10.

FIG. 5D is an explanatory view showing an example of a screen which is displayed on the display portion 10 for a user to perform log retrieval processing using the recording and reproducing apparatus 1 according to the second embodiment of the present invention. When the screen changes to the one as shown in FIG. 5C described earlier, a user selects "MACRO TABLE IN MS" to perform log retrieval processing using the macro table which is stored in the memory stick 21 and record a log file into the memory stick 21.

Next, the log retrieval execution processing portion 37 transmits a log retrieval execution command to the log macro task 32, and also transmits the macro table for retrieving a log, which is read out from the memory stick 21 in the step S203, to the log macro task 32 (step S204).

After that, log retrieval is performed in the same manner as the log retrieval method according to the first embodiment of the invention. Specifically, receiving the log retrieval execution command and the macro table, the log macro task 32 notifies the log retrieval execution processing portion 37 that retrieval is completed (step S206), executes analysis of the macro table which is read out from the log retrieval execution processing portion 37 to the log macro task 32, and converts it into a character string which the console task 34 can interpret (step S208). Then, the log macro task 32 performs processing of sequentially capturing log data of each of the operation tasks 35a, 35b and 35c and an exception log which is read out by the exception log read task 36 as a log retrieval operation according to the macro file.

Specifically, in this processing, the log macro task 32 passes a log retrieval request for the exception log read task 36 to the serial input/output task 33 (step S210). Receiving the log retrieval request from the log macro task 32, the serial input/output task 33 passes the log retrieval request to the console task 34 (step S212). Then, the console task 34 passes the log retrieval request to the exception log read task 36 (step S214).

Receiving the log retrieval request, the exception log read task 36 reads out an exception log which is recorded in the flash memory 5, converts it into ASCII data and obtains exception log data (step S216). Then, the exception log read task 36 passes the exception log data which is read out from the flash memory 5 to the console task 34 (step S218).

Receiving the exception log data, the console task 34 passes the exception log data to the serial input/output task 33 (step S220). Then, the serial input/output task 33 passes the received exception log data to the log macro task 32 (step S222), and the log macro task 32 stores the received exception log data into a log file, which is recorded into the memory stick 21 afterward (step S224).

After completing the storage of the exception log data, processing of retrieving log data of each operation task starts subsequently. The log macro task 32 passes a log retrieval request for the operation tasks 35a, 35b and 35c to the serial input/output task 33 (step S226). Receiving the log retrieval request from the log macro task 32, the serial input/output task 33 passes the log retrieval request to the console task 34 (step S228). Then, the console task 34 passes the log retrieval request to the operation tasks 35a, 35b and 35c (step S230).

Receiving the log retrieval request, the operation tasks 35a, 35b and 35c convert log data into ASCII data (step S232), and the console task 34 receives the converted log data (step S234). In this embodiment, the console task 34 executes a function defined by each operation task 35a, 35b, 35c according to a debug command string defined by each operation task. Then, the console task 34 retrieves log data which is stored in the form of binary codes in the operation tasks 35a, 35b and 35c as log data in the form of ASCII codes.

Receiving the log data of the operation tasks 35a, 35b and 35c, the console task 34 passes the log data to the serial input/output task 33 (step S236). Then, the serial input/output task 33 passes the received log data to the log macro task 32 (step S238), and the log macro task 32 stores the received log data into a log file, which is recorded in the memory stick 21 afterward (step S240).

After storing the exception log data and the log data into the log file, the log macro task 32 notifies the log retrieval execution processing portion 37 that macro file analysis is completed (step S242). In addition to the notification of completion of macro file analysis, the log macro task 32 passes the log file which is generated as a result of analyzing the macro file to the log retrieval execution processing portion 37. Receiving the notification of completion of macro file analysis, the log retrieval execution processing portion 37 writes the log file into the memory stick 21 (step S244). After completing writing of the log file, the memory stick 21 notifies the log retrieval execution processing portion 37 that writing is completed (step S246).

In the above operation, the log data of the operation tasks 35a, 35b and 35c of the recording and reproducing apparatus 1 and the exception log data recorded in the flash memory 5 are recorded into the memory stick 21 which is inserted in the slot 20. By examining the log data which is recorded in the memory stick 21, a service staff who handles the maintenance of the recording and reproducing apparatus 1 can locate the cause of malfunction without the need for the recording and reproducing apparatus 1 to be brought in.

Further, according to this embodiment, by storing a customized macro table into the memory stick 21, inserting the memory stick 21 which stores the macro table into the slot 20 and executing the macro table which is stored in the memory stick 21, it is possible to retrieve desired log data, in addition to log data which is obtained as a result of executing a macro table that is built in the recording and reproducing apparatus 1.

Although the recording and reproducing apparatus 1 is described as an example of electronic equipment in the above-described embodiments, the present invention may be widely applied to other electronic equipment. For example, it is applicable to a wide variety of electronic equipment such as audio equipment, video equipment, recording and reproducing apparatus, communication apparatus, information processing apparatus, and household electrical appliance. Particularly, the present invention is suitable for electronic equipment whose operation is controlled by a controller that is a built-in microcomputer/processor, which is equipment that stores log data, to which an external recording medium such as a memory stick can be inserted.

Although a preferred embodiment of the present invention is described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

For example, although exception log data is retrieved first and log data of operation tasks is retrieved after that in the embodiments described above, the present invention is not limited thereto. For instance, the order may be reversed, so that log data of operation tasks is retrieved first and exception log data is retrieved after that.

What is claimed is:

1. Electrical equipment, comprising:
   a flash memory;
   an external recording medium inserting portion to which a removable external recording medium is inserted;
   a macro file storage portion to store a macro file for acquiring log information under control of an operation system and log information outside control of the operation system at a time; and
   a processor that operates as:
   a macro file executing portion to execute the macro file stored in the macro file storage portion and record log information obtained as a result of executing the macro file into the removable external recording medium inserted in the external recording medium inserting portion,
   in which the log information outside control of the operation system is exception log information output as a result of exception handling being performed in a CPU whereupon exceptional interrupt handling is executed,
   the exception log information includes a program address indicating where exception handling by the CPU is performed and an execution state of the CPU before an occurrence of the exception handling, and
   the flash memory stores the exception log information, and the macro file executing portion executes the macro file stored in the macro file storage portion and records, into the removable external recording medium inserted in the external recording medium inserting portion, the exception log information obtained from the flash memory as a result of executing the macro file.

2. The electrical equipment according to claim 1, wherein the macro file executing portion reads log information from the flash memory that can be accessed by the CPU.

3. The electrical equipment according to claim 1, wherein the macro file executing portion converts a log data preserved in a binary code into ASCII character string respectively of two or more operation tasks, and obtains the log information.

4. Electrical equipment, comprising:
   a flash memory;
   an external recording medium inserting portion to which a removable external recording medium to store a macro file for acquiring log information under control of an operation system and log information outside control of the operation system at a time is inserted; and
   a processor that operates as:
   a macro file executing portion to execute the macro file stored in the removable external recording medium and record log information obtained as a result of executing the macro file into the removable external recording medium,
   in which the log information outside control of the operation system is exception log information output as a result of exception handling being performed in a CPU whereupon exceptional interrupt handling is executed,
   the exception log information includes a program address indicating where exception handling by the CPU is performed and an execution state of the CPU before an occurrence of the exception handling, and
   the flash memory stores the exception log information, and the macro file executing portion executes the macro file stored in the removable external recording medium and records, into the removable external recording medium, the exception log information obtained from the flash memory as a result of executing the macro file.

5. The electrical equipment according to claim 4, wherein the macro file executing portion reads log information from the flash memory that can be accessed by the CPU.

6. The electrical equipment according to claim 4, wherein the macro file executing portion converts a log data preserved in a binary code into ASCII character string respectively of two or more operation tasks, and obtains the log information.

7. A log output method, comprising:

storing, using a processor, a macro file for acquiring log information under control of an operation system and log information outside control of the operation system at a time; and executing the macro file stored in the storing step and recording log information obtained as a result of executing the macro file into a removable external recording medium, in which the log information outside control of the operation system is exception log information output as a result of exception handling being performed in a CPU whereupon exceptional interrupt handling is executed, the exception log information includes a program address indicating where exception handling by the CPU is performed and an execution state of the CPU before an occurrence of the exception handling, and the exception log information is stored in a flash memory, and the executing step executes the macro file stored in the storing step and records, into the removable external recording medium, the exception log information obtained from the flash memory as a result of executing the macro file.

8. A log output method, comprising:

storing, using a processor, a macro file for acquiring log information under control of an operation system and log information outside control of the operation system at a time into a removable external recording medium; and executing the macro file stored in the external recording medium and recording log information obtained as a result of executing the macro file into the external recording medium, in which the log information outside control of the operation system is exception log information output as a result of exception handling being performed in a CPU whereupon exceptional interrupt handling is executed, the exception log information includes a program address indicating where exception handling by the CPU is performed and an execution state of the CPU before an occurrence of the exception handling, and the exception log information is stored in a flash memory, and the executing step executes the macro file stored in the external recording medium and records, into the removable external recording medium, the exception log information obtained from the flash memory as a result of executing the macro file.

* * * * *